(12) United States Patent
Vierkant et al.

(10) Patent No.: US 8,448,735 B2
(45) Date of Patent: May 28, 2013

(54) CAB TILT WITH MULTIFUNCTION FLAG PIN AND LOCKING CYLINDER

(75) Inventors: Erich C. Vierkant, Dubuque, IA (US); Patrick J. Mulligan, Dubuque, IA (US); Matthew Davisdon, Dubuque, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/285,522

(22) Filed: Oct. 31, 2011

(65) Prior Publication Data
US 2013/0105236 A1 May 2, 2013

(51) Int. Cl.
*B62D 33/067* (2006.01)
(52) U.S. Cl.
USPC .................................. 180/89.14; 296/190.05
(58) Field of Classification Search
USPC . 180/89.14, 89.15, 89.17, 89.18; 296/190.01, 296/190.04–190.07
See application file for complete search history.

(56) References Cited

U.S. PATENT DOCUMENTS

| | | | | |
|---|---|---|---|---|
| 3,642,316 A | * | 2/1972 | Porth et al. | 296/190.05 |
| 3,797,882 A | * | 3/1974 | Brimhall | 296/190.06 |
| 3,797,883 A | * | 3/1974 | Steiner et al. | 180/89.14 |
| 3,958,659 A | * | 5/1976 | Selman | 180/89.15 |
| 4,327,810 A | * | 5/1982 | Jorda | 180/89.15 |
| 4,366,879 A | * | 1/1983 | Nordell | 180/89.15 |
| 4,452,329 A | * | 6/1984 | Stone et al. | 180/89.15 |
| 4,463,818 A | * | 8/1984 | Sonneborn | 180/89.15 |
| 5,839,278 A | * | 11/1998 | Sonneborn | 60/403 |
| 5,941,330 A | * | 8/1999 | Miller et al. | 180/89.15 |
| 6,854,546 B2 | * | 2/2005 | Beckstrom | 180/89.13 |
| 6,910,731 B2 | * | 6/2005 | Albright et al. | 296/190.05 |
| 7,607,721 B2 | | 10/2009 | Grimes et al. | |
| 7,673,931 B2 | * | 3/2010 | Takano et al. | 296/190.01 |
| 2004/0119320 A1 | * | 6/2004 | Albright et al. | 296/190.05 |
| 2010/0017662 A1 | | 1/2010 | Miller | |

* cited by examiner

*Primary Examiner* — Drew Brown
(74) *Attorney, Agent, or Firm* — Faegre Baker Daniels LLP

(57) ABSTRACT

An operator cab for a work vehicle is releasably mounted to a frame of the vehicle via a cab support pin and a flexible mount during vehicle work operations and rotationally attached via the cab support pin for servicing working parts of the work vehicle. A locking cylinder having an end pivotally connected to the cab allows movement of the pivotal connection relative to the cylinder, i.e., allows the cab to move relative to the frame as the flexible mount allows, during work operations. When the cylinder lifts the cab for servicing, movement of the pivotal connection relative to the cylinder is restricted.

17 Claims, 17 Drawing Sheets

CAB TILT WITH MULTIFUNCTION FLAG PIN AND LOCKING CYLINDER

FIELD OF THE INVENTION

This disclosure relates to tilting mechanisms and, more particularly, to tilting mechanisms for pivotally mounted operator cabs for work vehicles.

BACKGROUND OF THE INVENTION

Operator cabs for work vehicles are often mounted over working components of the vehicles such as engines, transmissions, etc., which usually generate noise and vibration. Thus, in order to reduce the noise and vibration experience of operators, operator cabs are, at times, mounted to the frames of the vehicles via flexible connections designed to absorb vibrations and to, thereby, reduce noise inside the cabs. These cabs must have travel limiting devices as part of the roll over protection structure (ROPS) to restrict cab travel empowered by the flexible mounts as unexpected loads may enable cab travel to greater distances than acceptable.

Further, such operator cabs must be somehow removable with respect to the frame of the vehicle in order to allow room to effect the inevitable servicing of the working components over which they, i.e., the cabs, are positioned. Traditionally, such cabs are removed from the service area via rotation toward the front, the rear, or either side of the vehicle using a corresponding hinge at the axis of rotation (see, for example, U.S. Pat. No. 7,607,721) or completely removed, via lift-off, from the frame of the vehicle (see, for example, US Patent Application Publication 2010/017662 A1) but these traditional solutions tend to be complex and/or inefficient when flexible mounts are used due to the nature and structure of the flexible mounts.

SUMMARY OF THE INVENTION

A vehicle includes a frame and an operator cab. The operator cab is attached to the frame via at least one mounting assembly capable of flexibly mounting the cab to the frame in a first adjustment and pivotally connecting the cab to the frame in a second adjustment where the first adjustment is for cab isolation and roll over protection during vehicle operations and the second adjustment is for service access to the vehicle. A flag pin serves as a motion limiting device for roll over protection in the first adjustment and as part of the pivotal connection in the second adjustment. A locking cylinder serves to lock the cab in place during servicing.

BRIEF DESCRIPTION OF THE DRAWINGS

Embodiments of the invention will be described in detail, with references to the following figures, wherein.

DESCRIPTION OF THE PREFERRED EMBODIMENT

Figure 1:
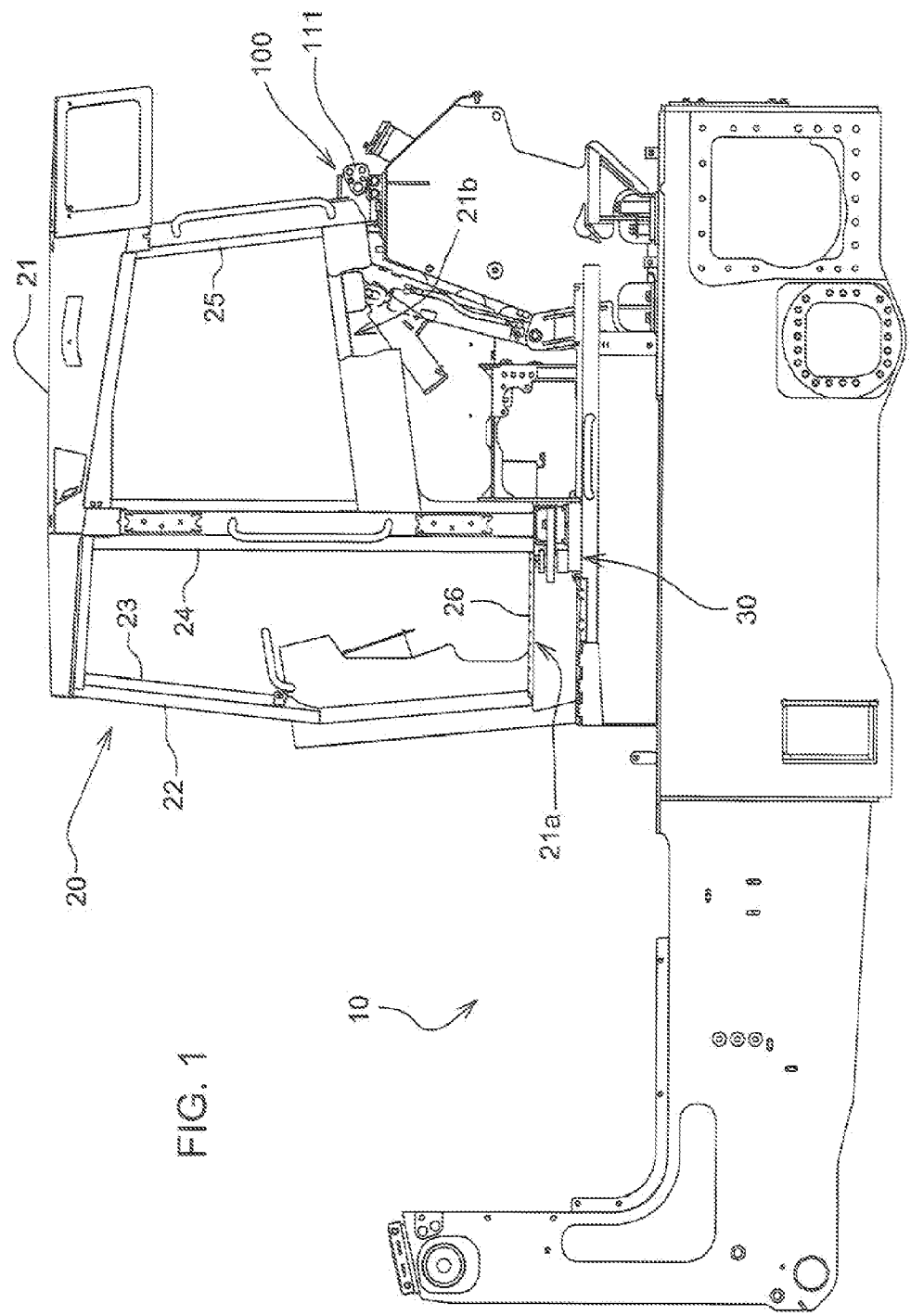
FIG. 1 is a side view of a frame for a work vehicle having an operator cab releasably mounted to it (the frame) via a front mounting assembly and a rear mounting assembly as well as a locking cylinder.

FIG. 1 illustrates an exemplary embodiment of a frame 10 of a working vehicle such as, for example, a dozer (not shown) having ground engaging tracks (not shown) and an operator cab 20. Underneath the cab 20, and attached to the frame 10 may be other conventional working components (not shown) of the vehicle which help to generate noise and vibration underneath the cab 20. Attaching the cab 20 to the frame 10 are front cab support assemblies 30 and rear cab support assemblies 100 on the left and right sides of the cab. A locking cylinder 200, which attaches the cab 20 and the frame 10 and is used to rotate the cab for servicing, is also shown. The front and rear cab support assemblies 30, 100 will be described for only one side of the frame 10 as, in this exemplary embodiment, they may be identically reflected on the other side of the frame 10.

The cab 20 includes a roof 21, two front support posts 23 (alternatively called A posts), two side support posts (alternatively called B posts) 24, two rear support posts (alternatively called C posts) 25, and a floor 26. The cab 21 has a lower portion 21*a* toward the front of the cab 20 and a higher portion 21*b* toward the rear of the cab 20.

Figure 2:
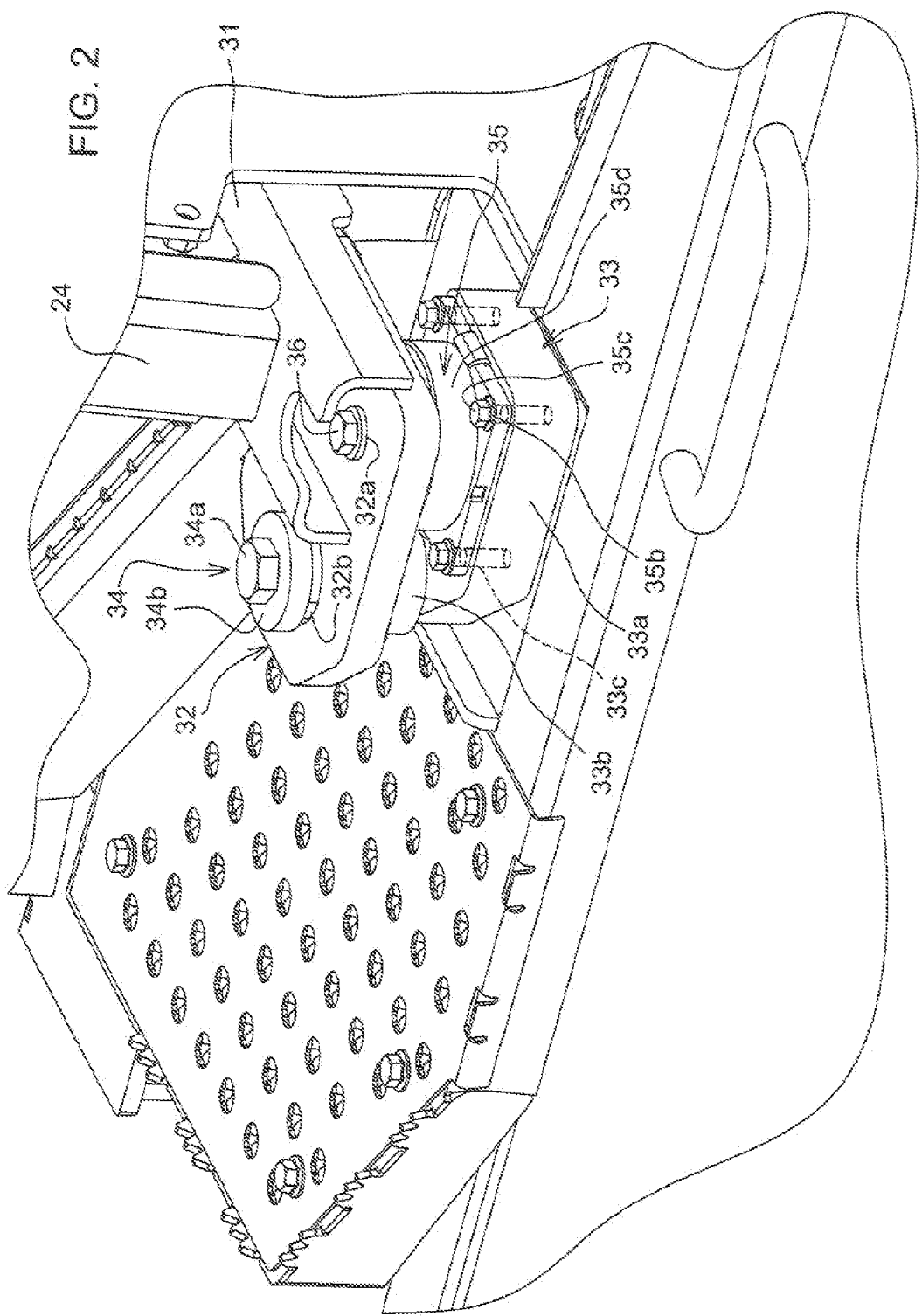
FIG. 2 is an enlarged oblique view of the front mounting assembly from a first side of the frame.

As illustrated in FIG. 2, in this exemplary embodiment, the cab 20 is supported at B post 24 via a front cab support assembly 30 which includes: a channel shaped front support bar 31 spanning the width of the cab 20 between the two B posts 24; a front support plate 32 welded to an end of the front support bar 31 and having an anchor hole 32*a* and a clearance hole 32*b*; a front mounting pad 33 welded to the frame 10 and including threaded holes (not shown), a lower mounting pad support area 33*a*, an elevated mounting pad support area 33*b*, damper hole (not shown) and threaded motion limiter attachment hole (not shown); a motion limiter bolt assembly 34 including a motion limiter bolt 34*a* having a diameter less than the diameter of the clearance hole 32*b* and a motion limiter washer 34*b* welded thereto and having a diameter greater than the diameter of the clearance hole 32b; a conventional viscous damper 35 having a suspension anchor hole 35a (see FIG. 11), and a damper attachment bracket 35' with damper attachment holes 35b (See FIGS. 3 and 11 also); damper attachment bolts 35c; and a suspension anchor bolt 36.

As illustrated in FIG. 2, in this exemplary embodiment, the damper attachment bolts 35c connect the viscous damper 35 to the mounting pad 33 and, thereby, to the frame 10 via the threaded holes 33c. The suspension anchor bolt 36 connects the front support plate 32 and, thereby, the front support bar 31, to the viscous damper 35 via the threaded damper mounting hole 35a (see FIG. 9), establishing a flexible and damped suspension for the cab 20 at the B post 24.

As illustrated in FIG. 2, the motion limiter bolt 34a extends through the clearance hole 32b and is secured to the raised mounting pad support area 33b by threaded attachment via a threaded motion limiter attachment hole (not shown). The distance provided between the front support plate 32 and the motion limiter washer 34b, when the front support plate is resting atop of the elevated mounting pad support area 33b, provides a limited area in which the front support plate 32, and thus, the cab 20, may vertically move with respect to the frame 10, the motion limiter bolt assembly 34 and the elevated mounting pad support area 33b restricting further vertical movement as the motion limiter washer 34b and the elevated mounting pad support area 33b are of greater diameter than the clearance hole 32b.

A first portion 35d of the damper 35 extends above the damper attachment bracket 35b. A second portion 35e of the viscous damper 35 extends below the damper attachment bracket 35' and through the damper hole 33c (see FIG. 11).

Figure 3:
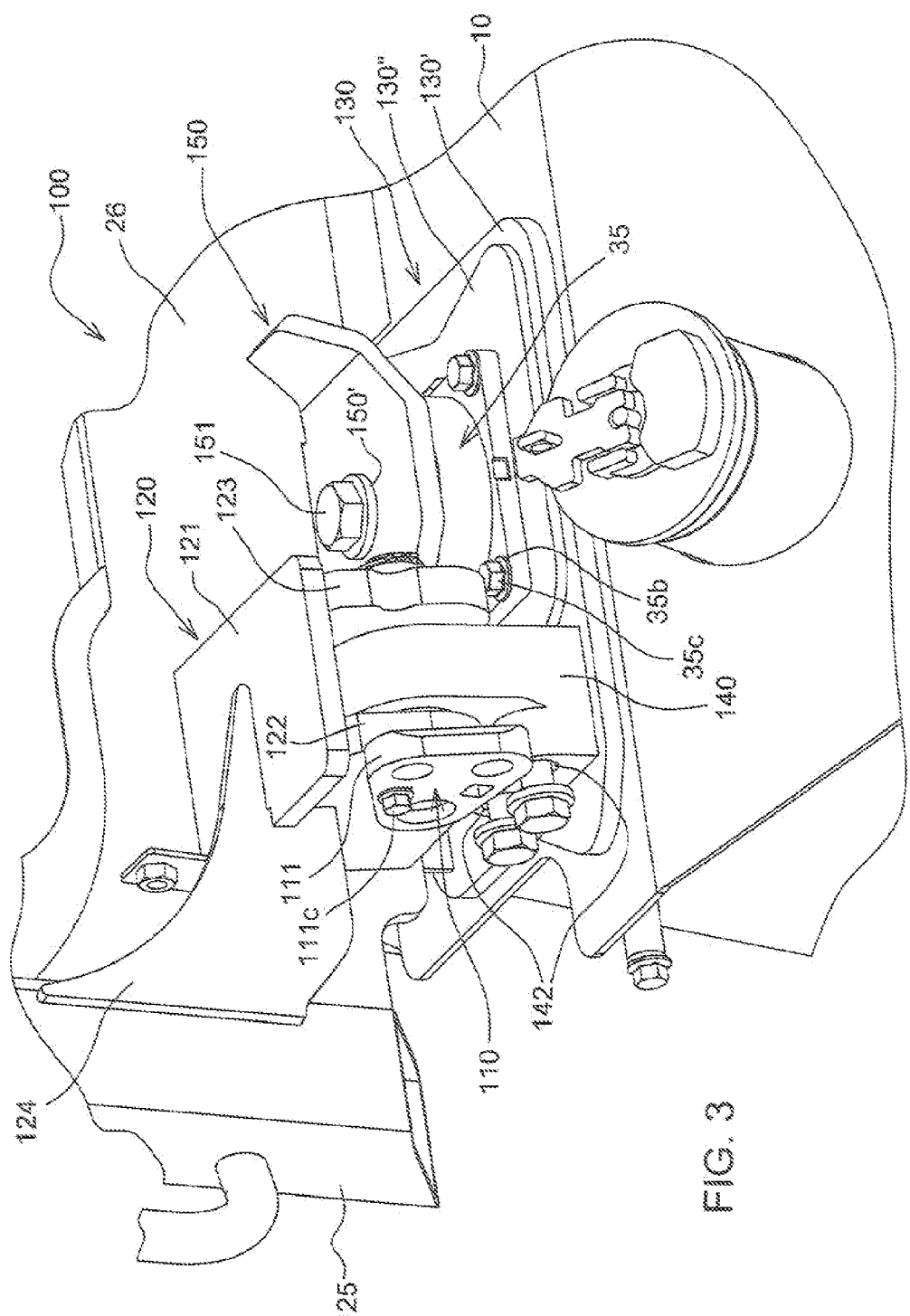
FIG. 3 is an enlarged oblique view of the rear mounting assembly from the first side of the frame.

As illustrated in FIG. 3, the cab 20 is supported near C post 25 via a rear cab support assembly 100, including: a cab support pin 110; a cab attachment bracket 120; a rear mounting pad 130 welded to the frame 10 over the fuel tank (not shown) and having a lower rear mounting pad portion 130' and an elevated rear mounting pad portion 130''; a travel limiting bracket 140 welded to the rear mounting pad 130; a rear support plate 150 welded to the rear cab panel 26 and the cab attachment bracket 120 and including a rear anchor hole 150' (see FIG. 11 also); and a conventional viscous damper 35 having a threaded anchor hole 35a and damper attachment bracket 35' with holes 35b (see FIG. 11 also); rear suspension anchor bolt 151; and damper attachment bolts 35c.

Figure 4:
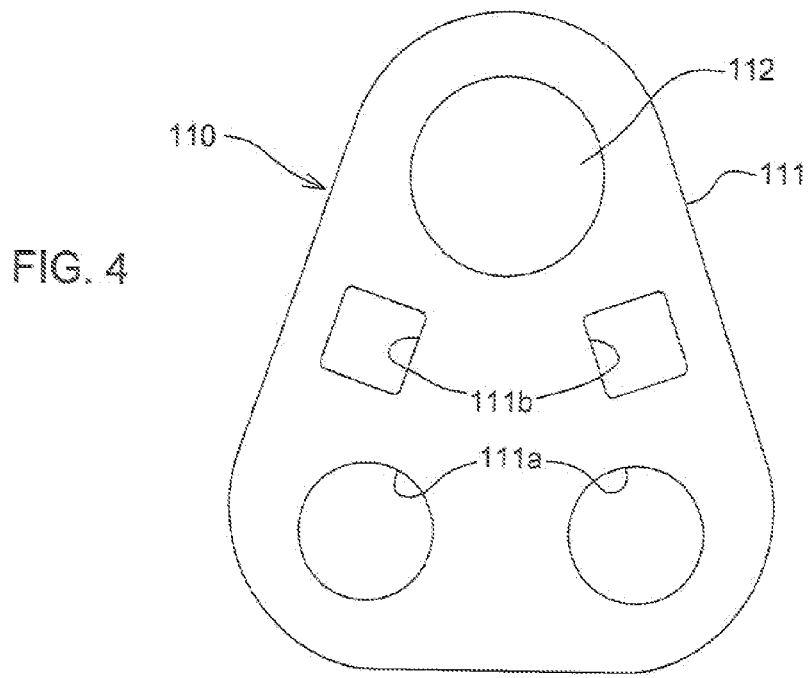
FIG. 4 is a side view of a cab support pin.
Figure 5:
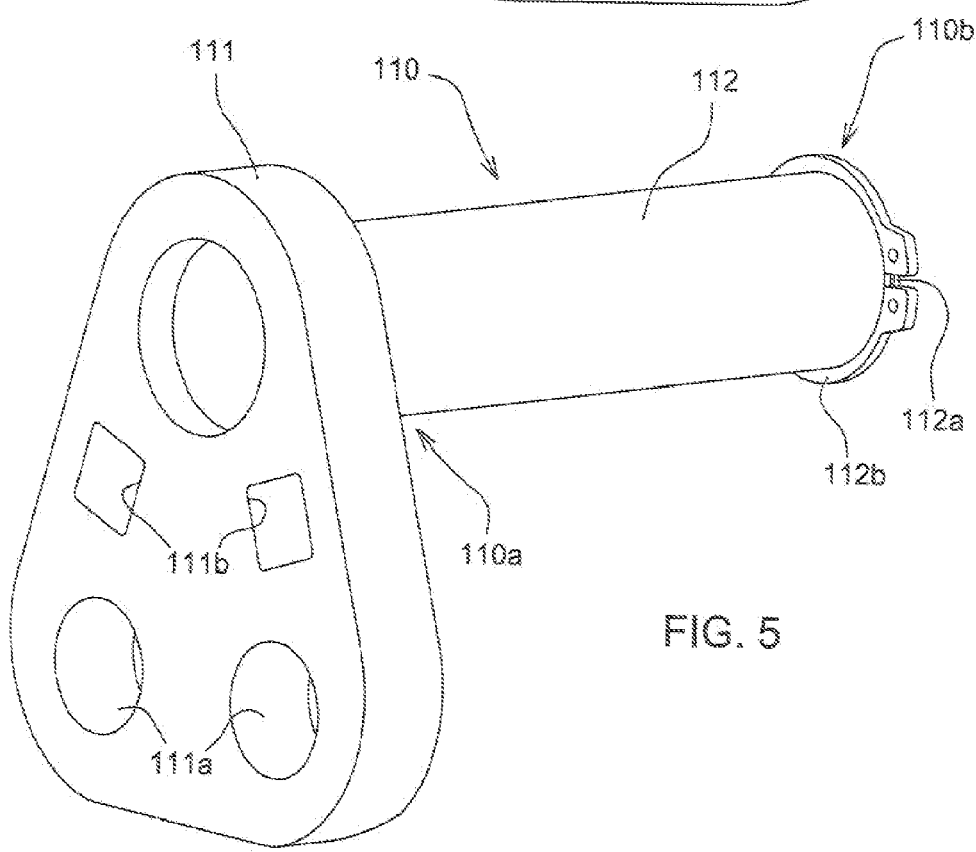
FIG. 5 is an oblique view of the cab support pin of FIG. 4.

As illustrated in FIGS. 4 and 5, the cab support pin 110 includes a flag 111 at a first end 110a of the cab support pin 110 and a shank 112 having a groove 112a, the groove positioned near a second end 110b of the cab support pin 110. The flag 111 includes cab support holes 111a and anchor holes 111b. Dual anchor holes 111b exist to allow each cab support pin 110 to be similarly located angularly regardless of the side of the frame 10 on which it is placed.

Figure 6:
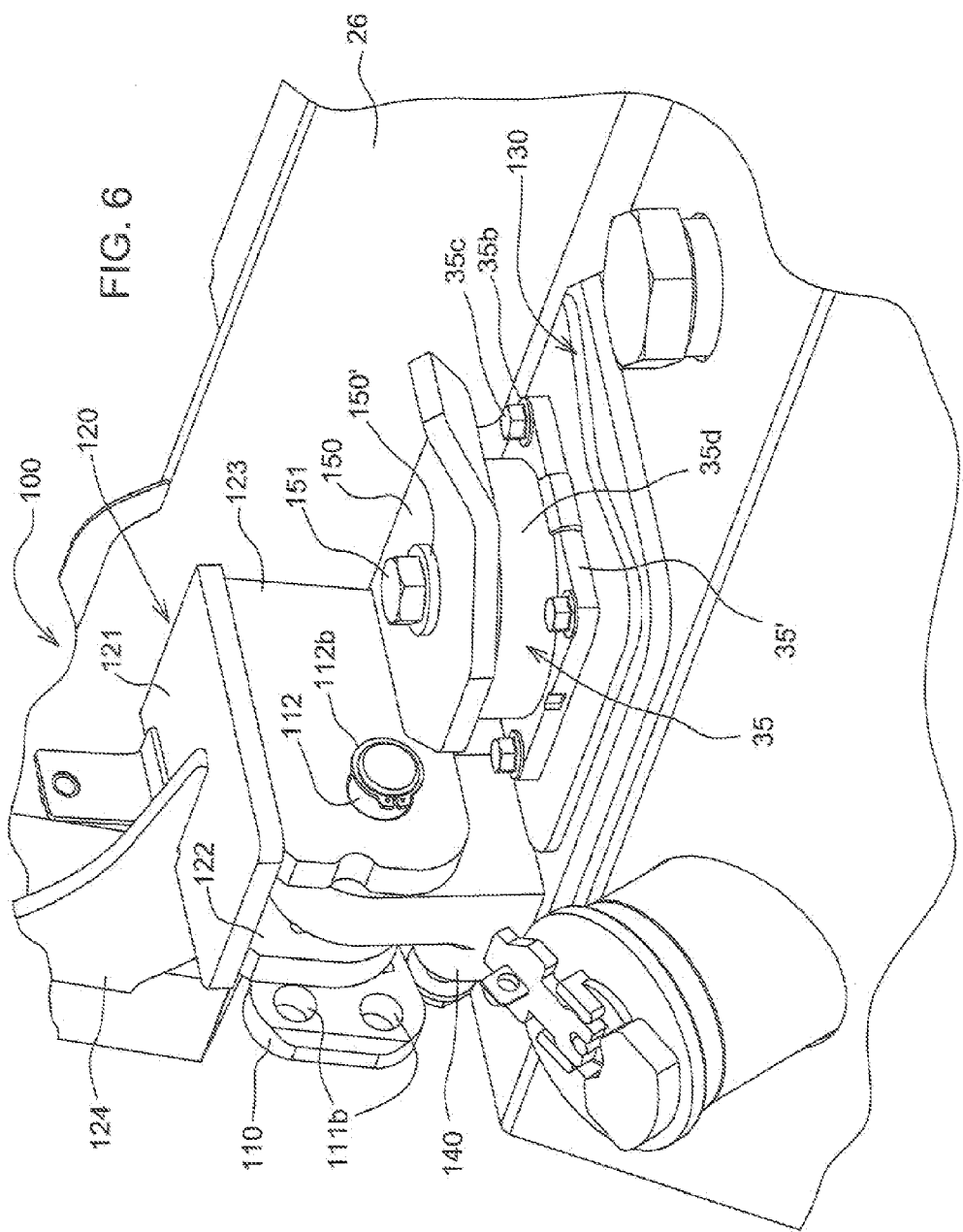
FIG. 6 is an enlarged oblique view of the rear mounting assembly of FIG. 3 from a second side of the frame.

As shown in FIG. 6, in this exemplary embodiment the damper attachment bolts 35c connect the viscous damper 35 to the mounting pad 130 and, thereby, to the frame 10 of the vehicle (not shown) via the damper attachment holes 35b and the threaded holes (not shown) in the rear mounting pad 130. As illustrated, a first portion 35d of the damper 35 extends above the damper attachment bracket 35'. A second portion 35e of the viscous damper 35 extends below the damper attachment bracket 35' and through the damper anchor hole 132 (See FIG. 11).

Figure 7:
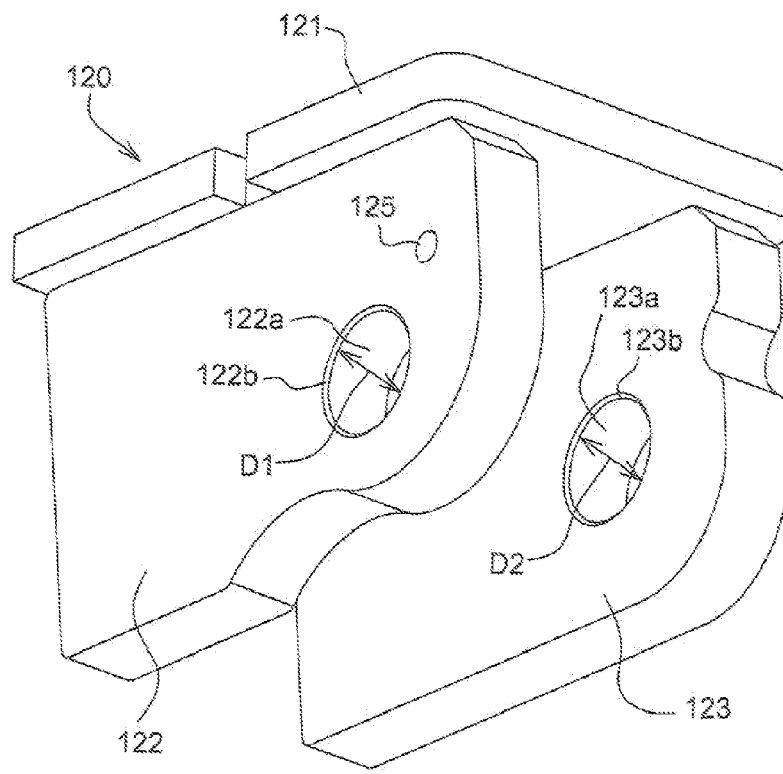
FIG. 7 is an oblique view of a cab attachment bracket.
Figure 8:
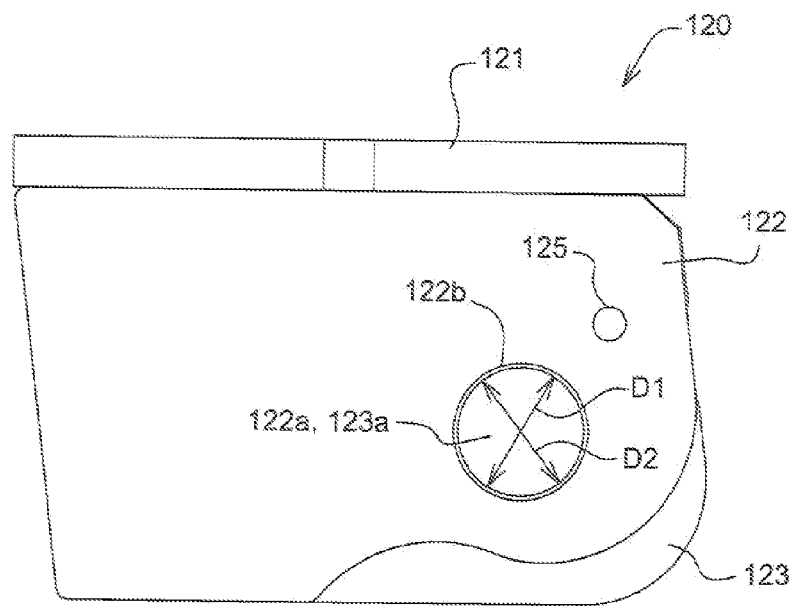
FIG. 8 is a side view of the cab attachment bracket of FIG. 6.
Figure 11:
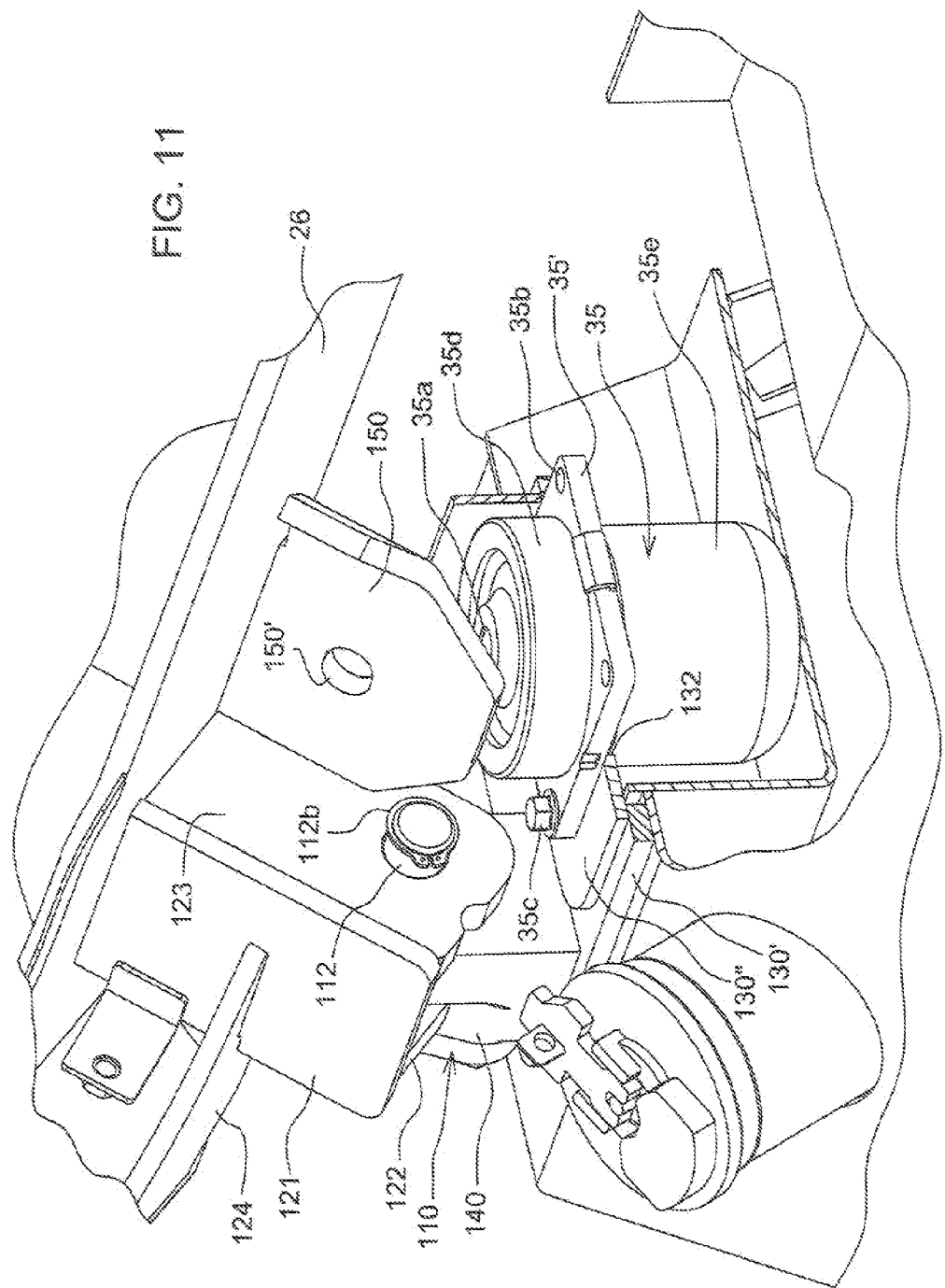
FIG. 11 is a perspective view of the rear mounting assembly of FIG. 6 after the cab is rotated.

As shown in FIGS. 7 and 8, in this exemplary embodiment the cab attachment bracket 120 includes: an upper plate 121; a first side plate 122; and a second side plate 123. The first side plate 122 is positioned closer to the C post 25 than the second side plate 123. The upper plate 121, the first side plate 122, and the second side plate 123 are welded together as illustrated. The attachment bracket is welded to the rear cab panel 26 as illustrated in FIGS. 3, 6 and 11. A bracket brace 124 is welded to the top plate 121, the first side plate 122, and the C post 25 for additional structural support for the attachment bracket 120 (see FIGS. 3, 6 and 11). As shown in FIG. 8, the side plates 122, 123 include substantially coaxial first and second cylindrical holes 122a, 123a having substantially equal diameters D1, D2 and including chamfers 122b, 123b for ease of pin insertion. The first side plate 122 also includes a threaded flag attachment hole 125 for the flag 111 of the cab support pin 110.

Figure 9:
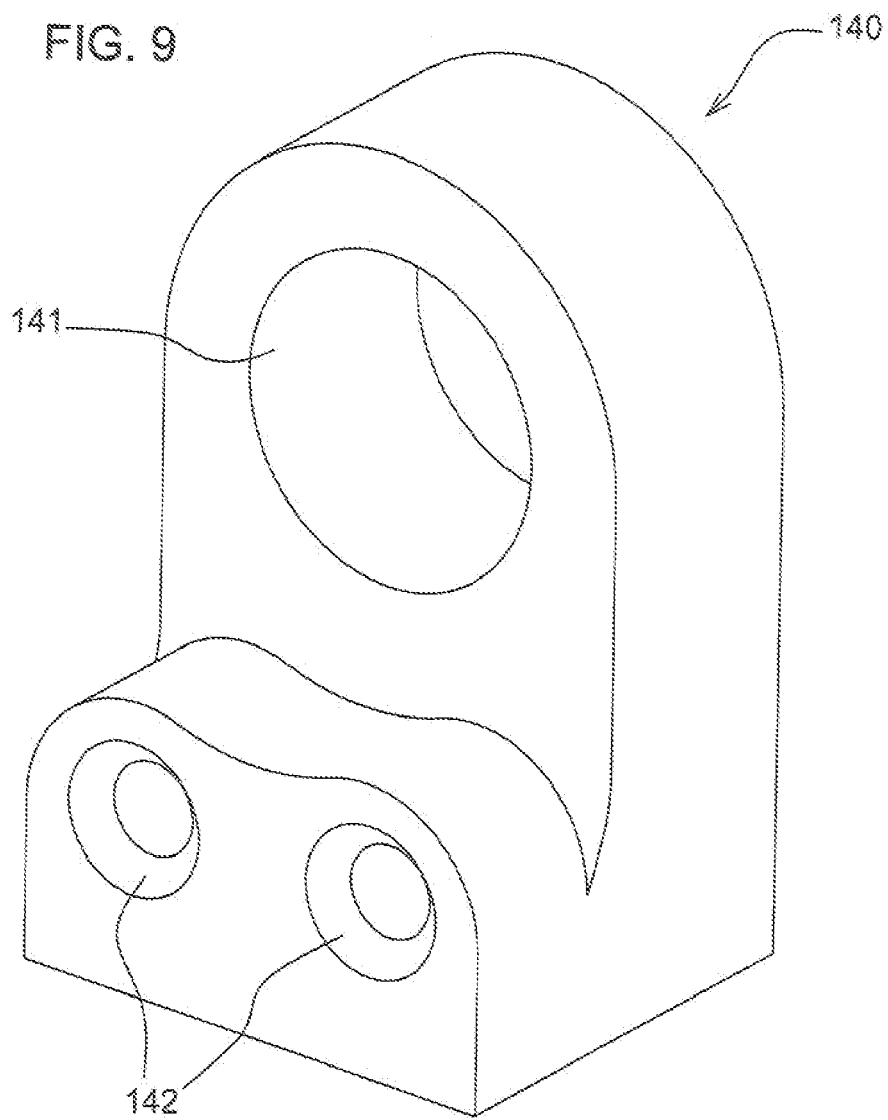
FIG. 9 is an oblique view of a travel limiting bracket.
Figure 10:
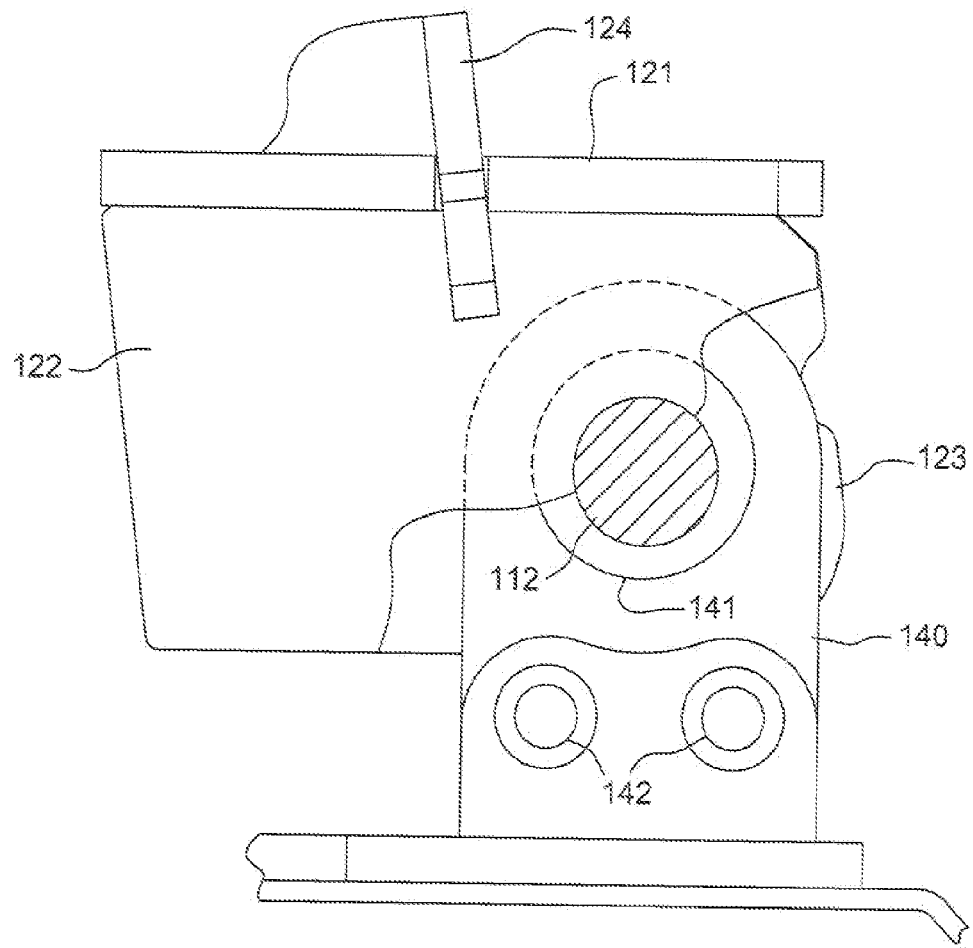
FIG. 10 is a side view of the cab attachment bracket of FIG. 8, the travel limiting bracket of FIG. 9 and the cab support pin of FIG. 5 after assembly.

As shown in FIGS. 9 and 10, the travel limiting bracket 140 is, in this particular embodiment, welded to the rear mounting pad 130, and includes a clearance hole 141 and threaded flag support holes 142. The clearance hole 141 is sized to allow a desired amount of vertical, horizontal, and rotational movement for the shank 112 when the cab is supported by the rear viscous damper 35 during vehicle operations. As shown in FIGS. 3, 6 and 11, the rear support plate 150 may be welded to the second side plate 123 of the attachment bracket 120 and the rear cab panel 26. The rear suspension anchor bolt 151 connects the viscous mount 35 to the rear support plate 150 and, thereby, to the cab attachment bracket 140 and the cab 110 via the threaded damper anchor hole 35a.

As indicated in FIGS. 3 and 6, the shank 112 extends through the first cylindrical hole 122a of the cab attachment bracket 120, the clearance hole 141 of the travel limiting bracket 140 and the second cylindrical hole 123a of the cab attachment bracket 120. A snap ring 112b fits into groove 112a to hold the shank in place longitudinally.

Figure 12:
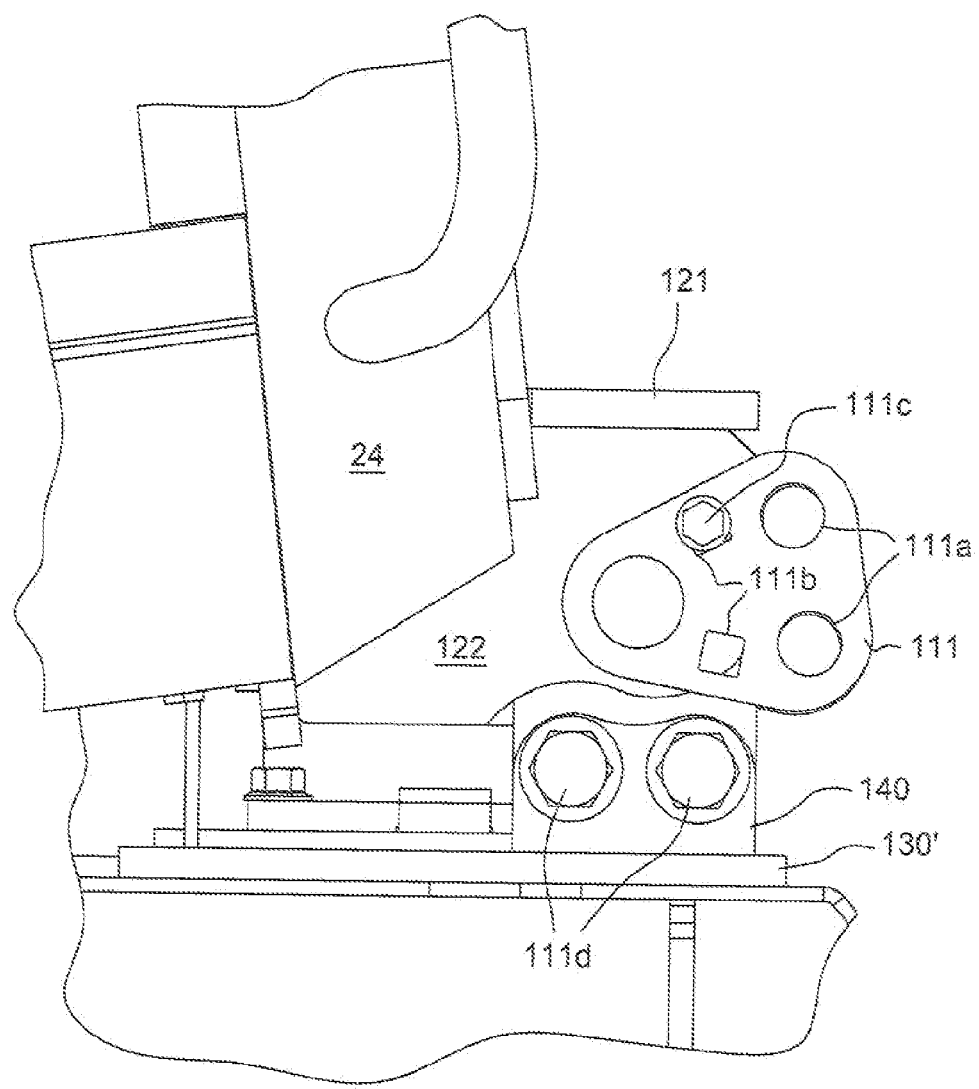
FIG. 12 is a side view of the cab and the rear mounting assembly when the mounting assembly is adjusted for vehicle operations.

As shown in FIGS. 3 and 12, when the cab 20 is suspended, i.e., when the rear support plate 150 is supported by the viscous damper 35, the flag 111 of the cab support pin 110 is connected to the cab attachment bracket 120 via a flag anchor bolt 111c. Thus, the cab support pin 110 may float with respect to the motion limiting bracket 140 but is fixed, with respect to the attachment bracket 120.

Figure 13:
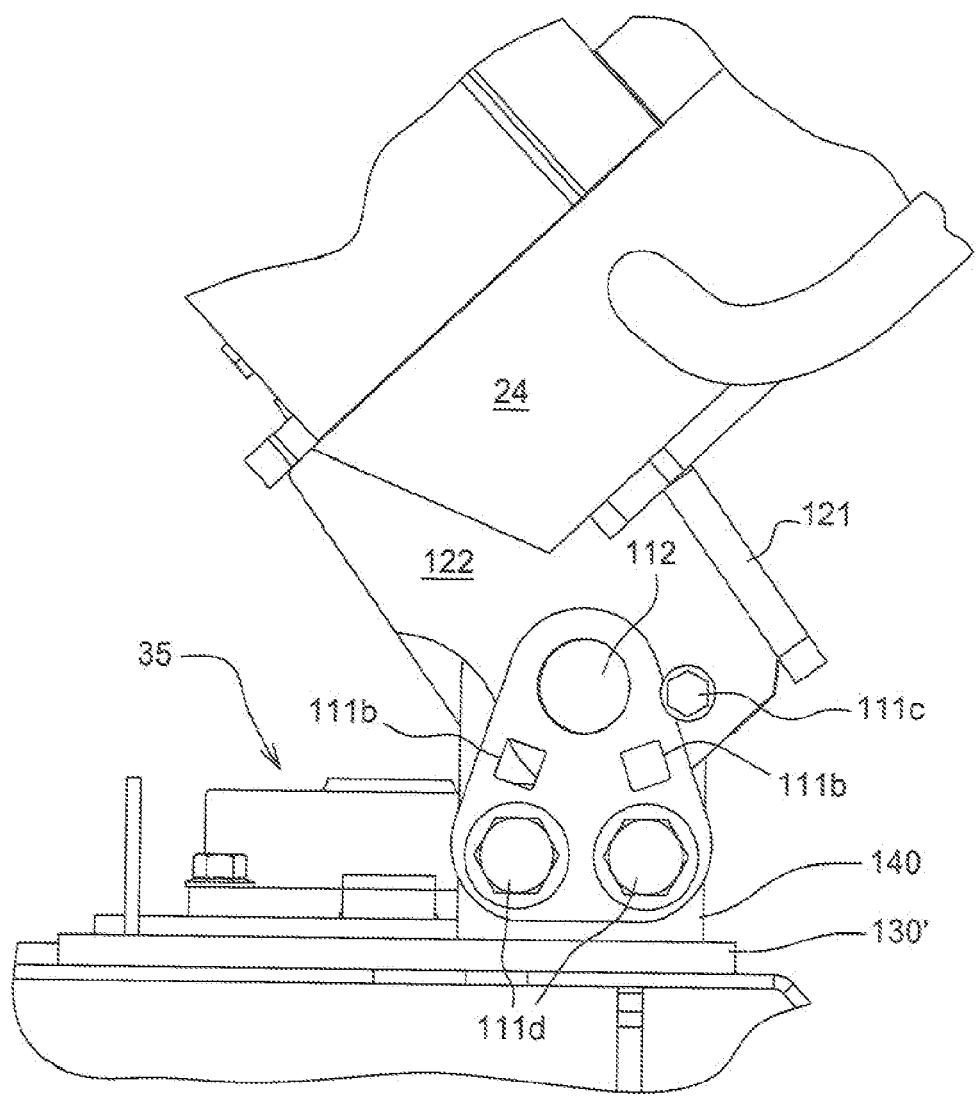
FIG. 13 is a side view of the cab and the rear mounting assembly when the mounting assembly is adjusted for vehicle servicing.

In operation, to accomplish cab rotation, the cab support screws 111d are removed from the threaded flag support holes 142, the flag anchor bolt 111c is removed from the threaded flag attachment hole 125 and the cab support pin 110 is rotated to align the cab support holes 111a with the threaded flag support holes 142. The cab support screws 111d are then fitted through the cab support holes 111a and screwed into the flag support holes 142. Finally, suspension anchor bolt 151 is removed from the threaded damper mounting hole 35a and the rear anchor hole 150' and the cab 20 is rotated to the service position and held in place with the aid of a hydraulic locking cylinder 200 the operation of which will be explained later. To return the cab 20 to suspension for vehicle operation, the flag anchor bolt 111c is removed and the cab 20 is rotated from the service position to the operating position shown in FIG. 12. The suspension anchor bolt 36 is then fitted through the rear anchor hole and screwed into the threaded damper mounting hole 35a. The cab support screws 111d are then removed, the flag is rotated to align the flag anchor hole 111b with the threaded flag attachment hole 125 and the anchor bolt 111c is fitted through the flag anchor hole 111b and screwed into the threaded flag attachment hole 125 to attach the flag 111 of the cab support pin 110 to first side plate 122 of the cab attachment bracket 120. Finally, the cab support screws 111d are re-screwed into the flag support holes 142. FIGS. 12 and 13 illustrate views of the cab 20 and the cab support pin 110 when the cab 20 is in the work, or suspended position and the raised, or service, position, respectively.

Figure 14:
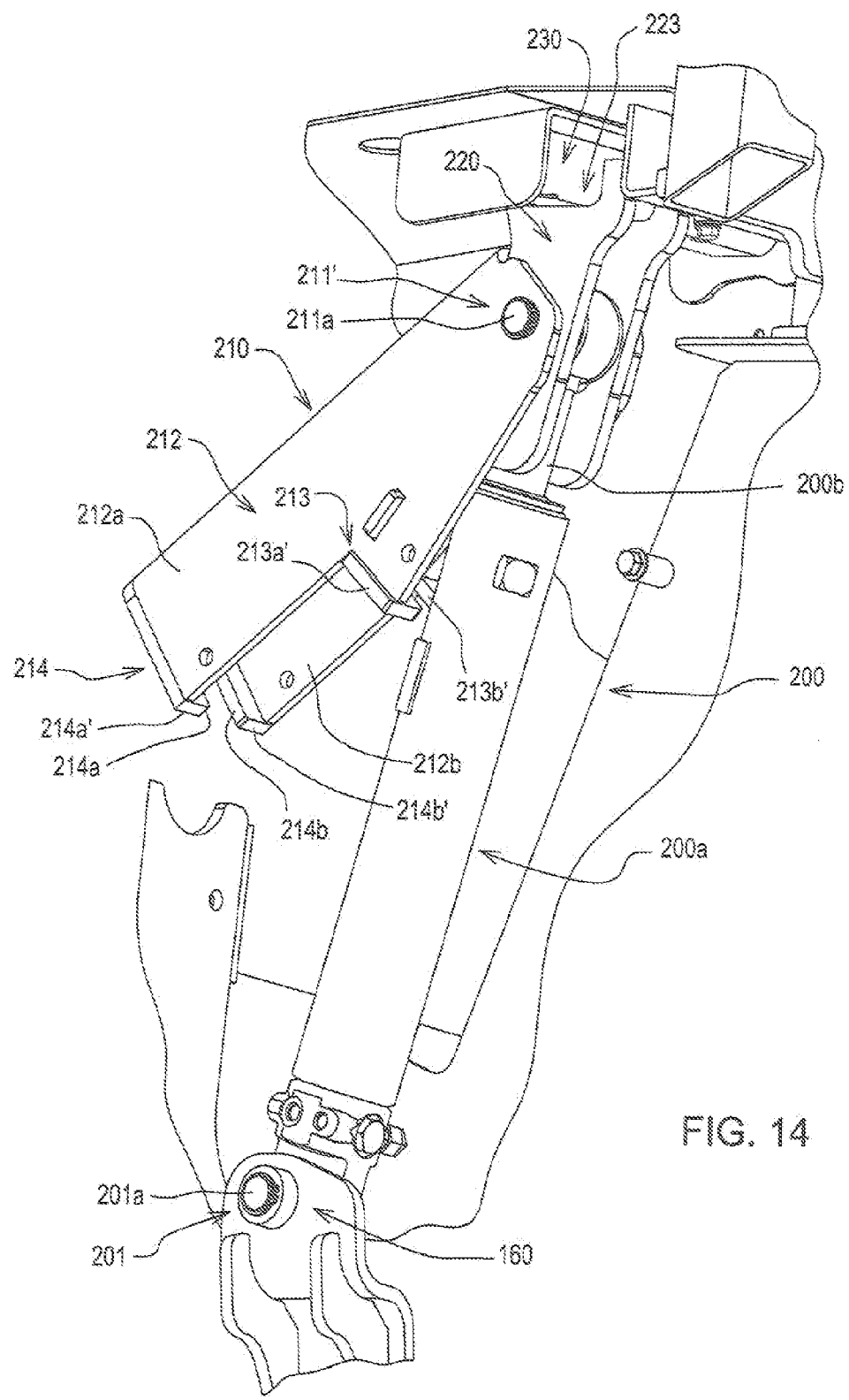
FIG. 14 is an oblique view of a locking cylinder illustrated in FIG. 1.
Figure 15:
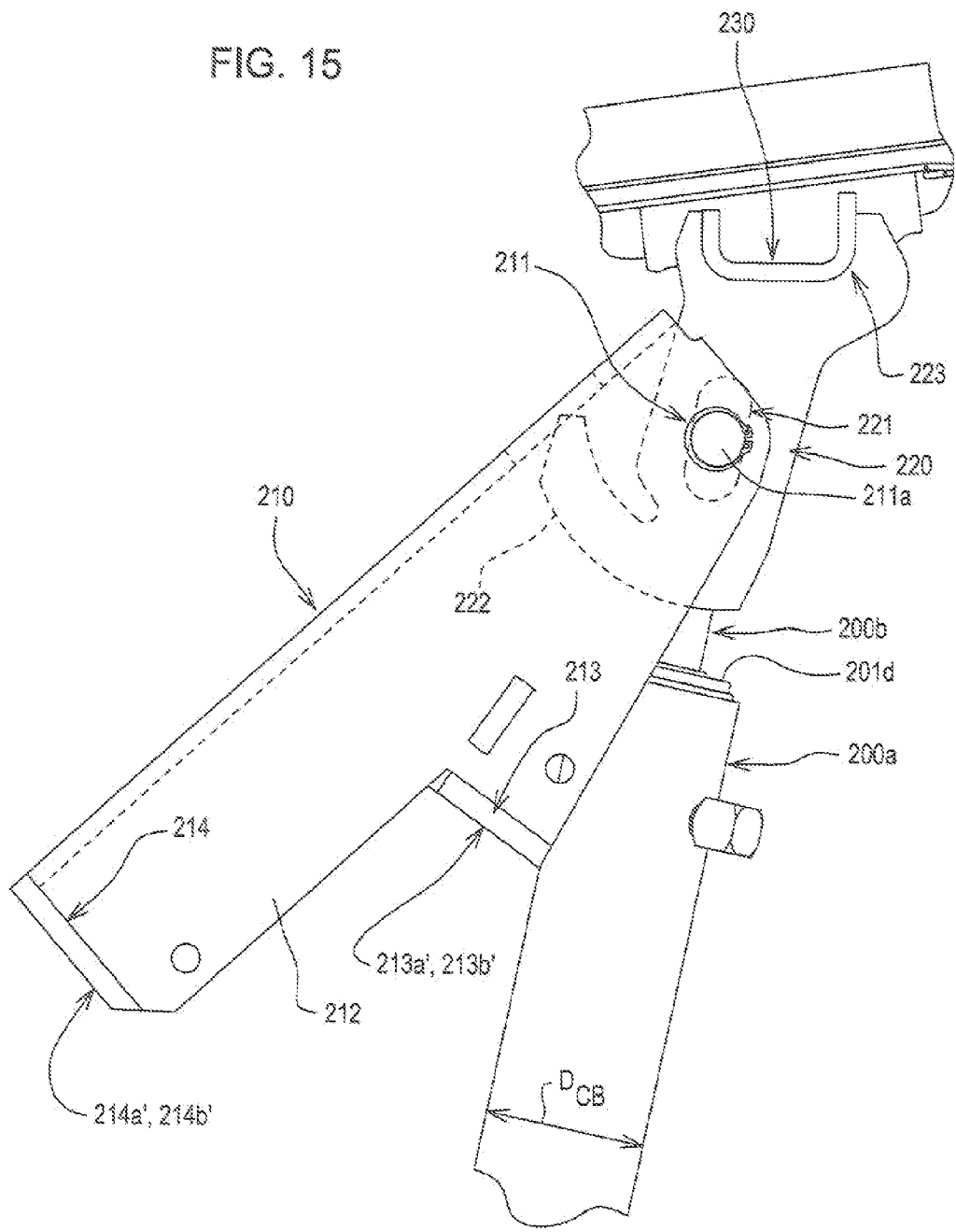
FIG. 15 is a side view of the locking portion of the locking cylinder illustrated in FIGS. 1 and 14 when the cab is suspended, i.e., during vehicle operations.

The locking cylinder 200, as illustrated in FIGS. 14 and 15 may include: a cylinder barrel 200a having a conventional barrel connection hole (not shown); a cylinder rod 200b having a conventional rod connection hole (not shown); a barrel pivot 201; a locking bracket 210; a bracket pivot 211'; a cab plate 220 (in this particular case, two (2) cab plates 220); and cab plate slots 221, cab plate hooks 222 and cab plate support notches 223 formed in the cab plates 220. As illustrated, the cab plate support notches 223 cooperate with a cab support bracket 230, which is rigidly attached to the cab 20, to support the cab 20 as the locking cylinder 200 is extended.

As illustrated, the barrel pivot 201 may be conventional and may include: the barrel connection hole (not shown); a threaded barrel pin or bolt 201a fitting through the conventional barrel connection hole; a barrel connecting nut (not shown) threaded onto the threaded barrel pin to secure it as part of the barrel pivot 201; and a barrel frame mount 160 located on the main frame 11 as illustrated and including mounting holes 161. A cylinder rod pivot 211 may include: the cylinder rod connection hole 200a'; a threaded cylinder rod pin 211a; and the cab plate slots 221 as illustrated.

The bracket pivot 211' may include the conventional cylinder rod connection hole 200a' at a distal end of the cylinder rod 200b; the threaded cylinder rod pin 211a; a cylinder rod nut 231a for securing the threaded cylinder rod pin in the bracket pivot 211'; a bracket nut 231c; and the cab plate slots 221. As illustrated, the locking bracket 210 may include a metallic portion 212 roughly shaped as a channel having a distance $D_{cs}$ between its sides 212a and 212b that is greater than a cylinder barrel diameter $D_{CB}$. The locking bracket 210 may also include: a rubber layer 213 having first and second layer sidewalls 213a, 213b; and a rubber bushing 214 having first and second bushing sidewalls 214a, 214b. A distance $D_{BS}$ between the first and second layer sidewalls 213a, 213b may be less than the cylinder barrel diameter $D_{CB}$ and wider than a cylinder rod diameter $D_{CR}$. A distance $D_{LS}$ between the first and second bushing sidewalls 214a, 214b may also be less than the cylinder barrel diameter $D_{CB}$ and greater than the cylinder rod diameter $D_{CR}$.

As indicated in FIGS. 15-18, the first and second layer sidewalls 214a, 214b may be shaped such that, via a weight of the locking bracket 210, they contact and slide along a barrel surface 202 at the cylinder barrel diameter $D_{CB}$ until they clear an end surface 201d of the cylinder barrel 200a. Upon clearing the end surface 201d of the cylinder barrel 200a, the first and second layer sidewalls 213a, 213b, via the clearance between the first and second layer sidewalls 213a, 213b and the cylinder rod 200b, may allow the locking bracket 210 to move toward the cylinder rod 200b such that first and second layer end surfaces 213a', 213b' may contact or rest upon the barrel end surface 201d and provide structural support for the cab 20. However, as illustrated, the locking bracket 210 may be shaped such that the first and second bushing sidewalls 214a, 214b may slide upon the barrel surface 202 after the first and second layer end surfaces 213a', 213b' clear the barrel surface 202 and as the cylinder rod 200b continues to extend until the first and second bushing end surfaces 214a', 214b' clear the barrel surface 202 at which point the locking bracket 210 may be allowed to move toward the cylinder rod 200b due to a clearance between the first and second bushing sidewalls 214a, 214b and the cylinder rod 200b such that first and second bushing end surfaces 214a', 214b' may contact and/or rest upon the barrel end surface 201d providing structural support for the cab 20.

The locking bracket 210 may also include locking bracket slots 215 formed to mate with the cab plate hooks 222 as the locking bracket 210 rotates with respect to the cab plate plate slots 221 and assumes a first locking position $LP_1$ or a second locking position $LP_2$ such that the cab plate hooks 222 mate with and pass through the locking bracket slots.

Figure 16:
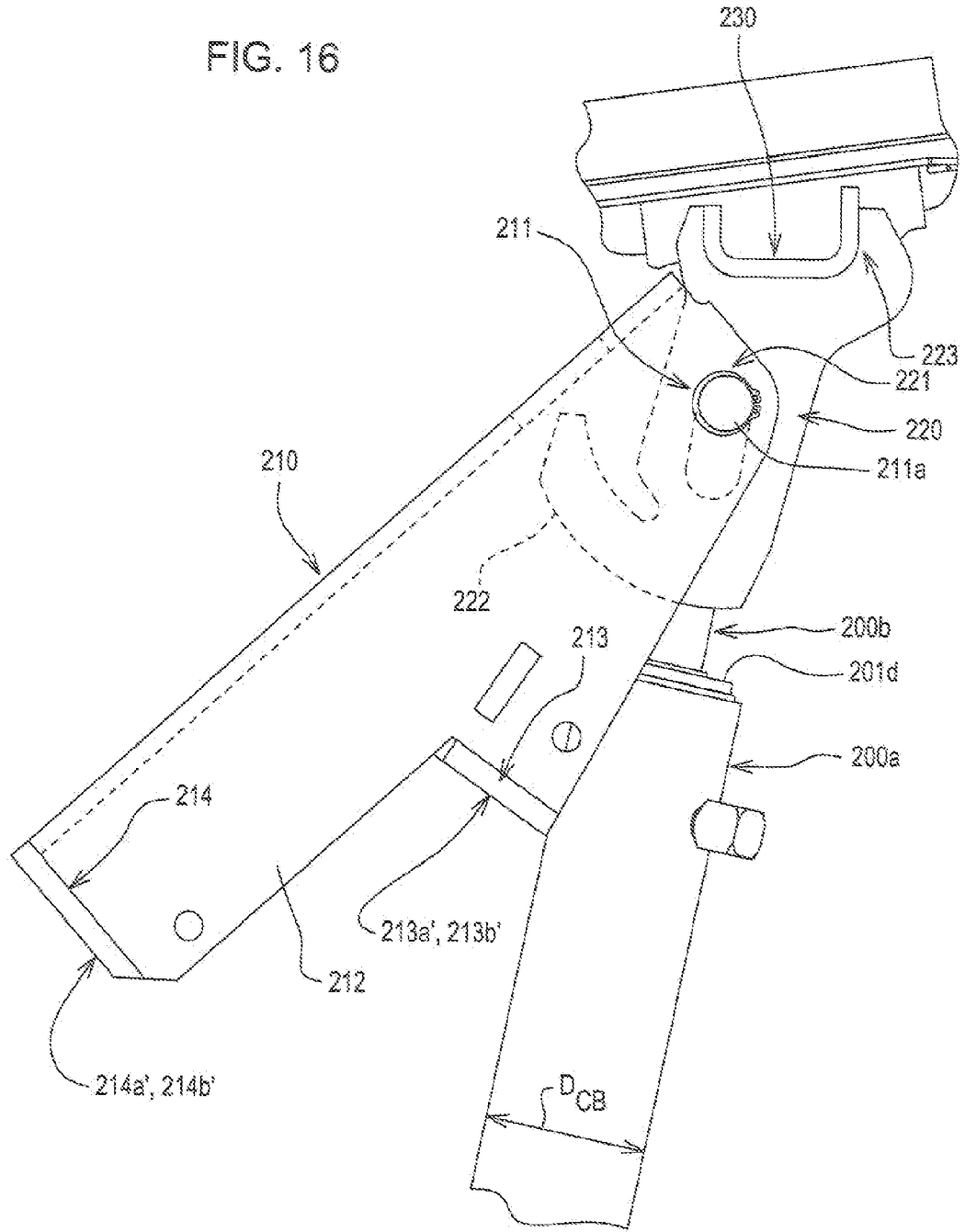
FIG. 16 is a side view of the locking portion of the locking cylinder as the cylinder begins to extend.

The cab plate slots 221 may be arranged such that, when the cab 20 is suspended, the cylinder rod pin 211a is free to travel the length of the cab plate slots 221 as is necessary to afford sufficient freedom of the cab 20 to effect cab suspension (see FIG. 15). As illustrated in FIG. 16, once the cab 20 begins to rotate upwards for servicing the relative motion between the cylinder rod pin 211a and the cab plates 220 may cause the cylinder rod pin 211a to be located closer to the top of the cab plate slots 221 as the extending locking cylinder 200 extends under the weight of the cab 20.

The locking bracket 210 allows the cab 20 to be mechanically locked/structurally supported at two angles during a service lift, i.e., during a cab rotation upwards. Mechanical support may be afforded with or without hydraulic power once either the first and second layer end surfaces 213a', 213b' or the first and second bushing end surfaces 214a', 214b' contact or rest upon the end barrel surface 201d.

Figure 17:
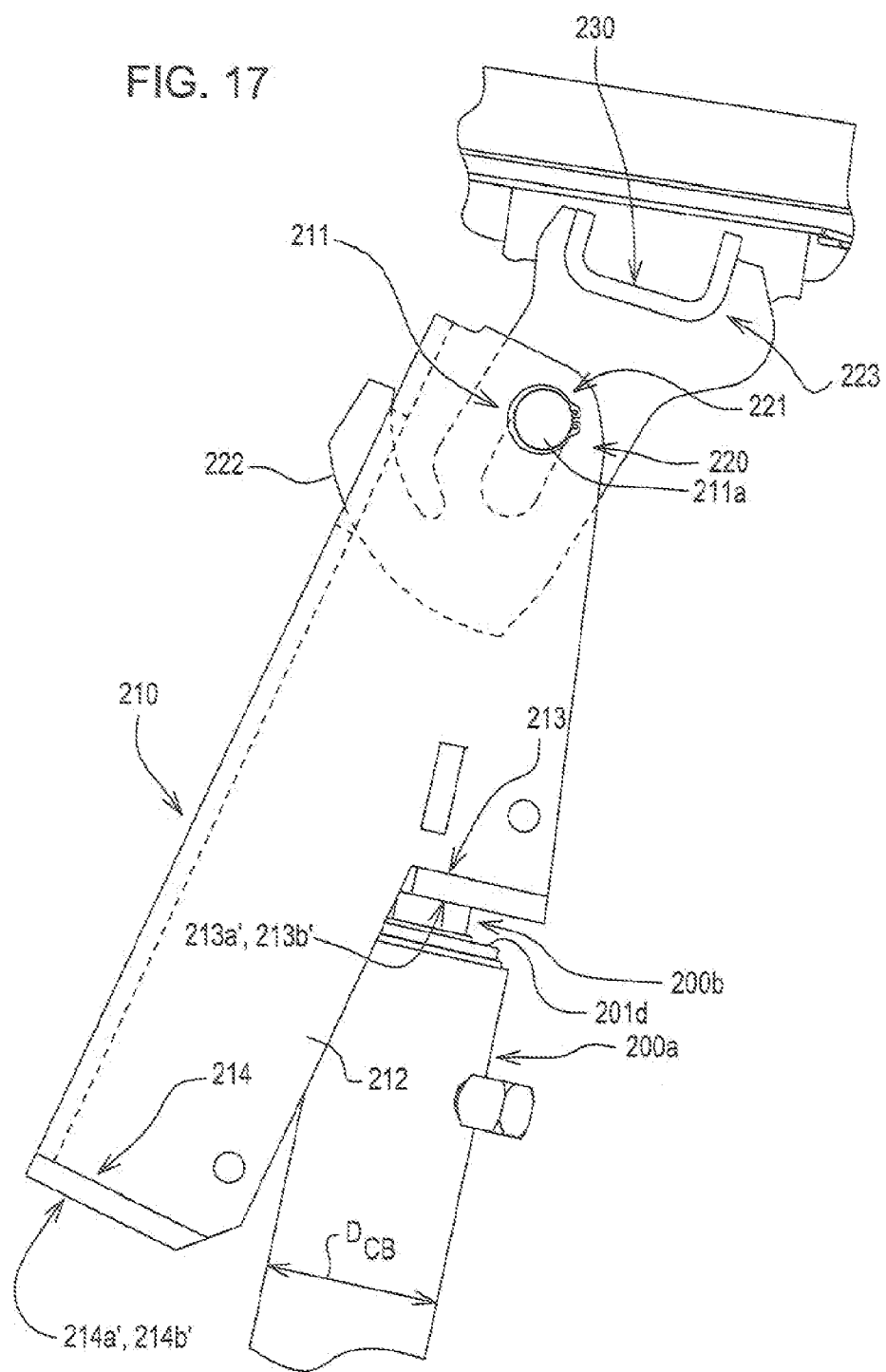
FIG. 17 is a side view of the locking portion of the cylinder as it enters locking one a locking position.
Figure 18:
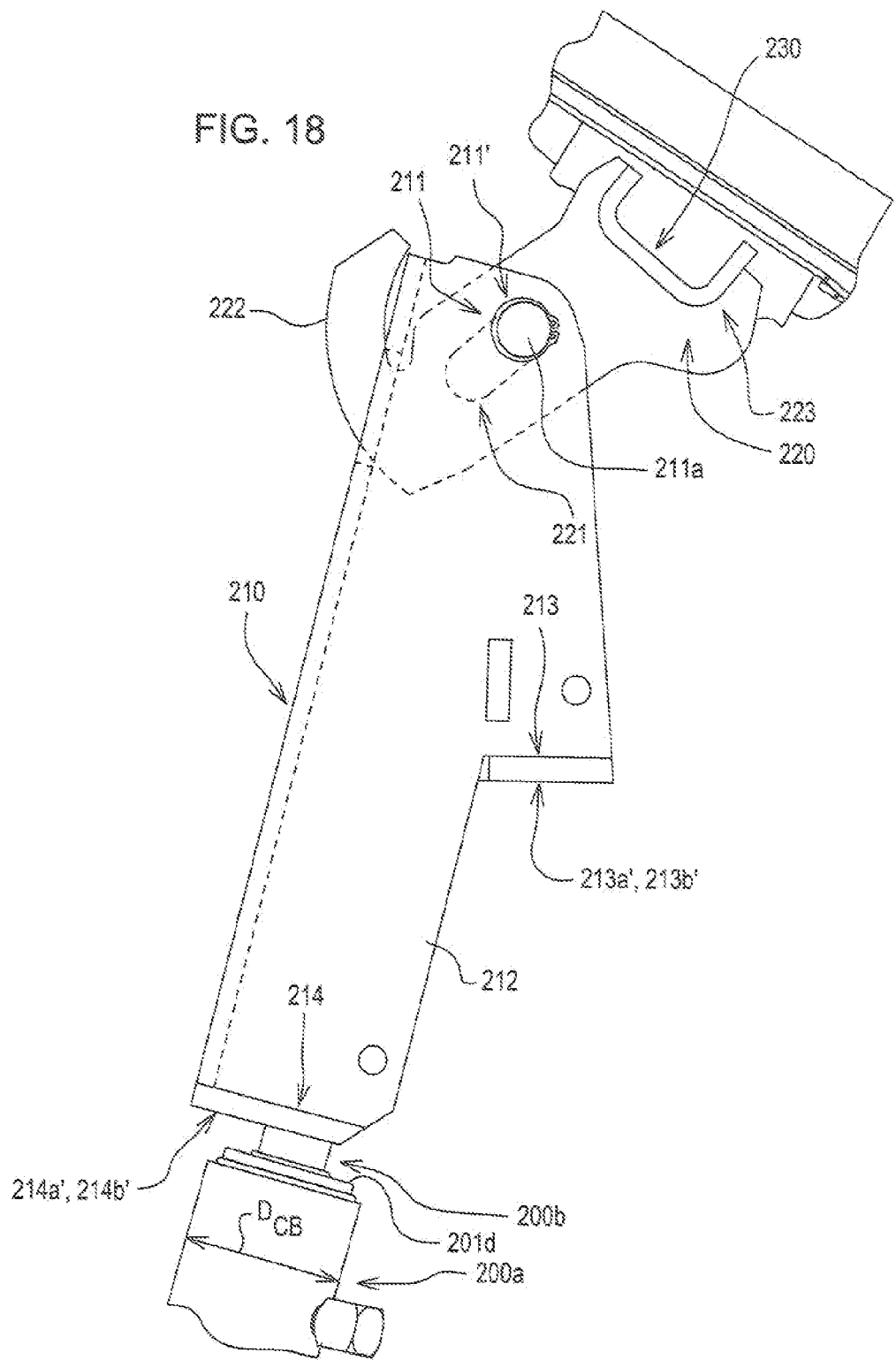
FIG. 18 is a side view of the locking portion of the locking cylinder as it enters another locking position.

As illustrated in FIG. 17, the smaller support/locking angle, i.e., the first angle $A_1$, may occur at the point at which the first and second layer end surfaces 213a', 213b' rest upon the barrel end surface 201d and, thereby, support the cab 20. As illustrated in FIG. 18, the larger support/locking angle, i.e., the second angle $A_2$, may occur at the point at which the first and second bushing end surfaces 214a', 214b' rest upon the barrel end surface 201d and, thereby, support the cab 20. The locking bracket 210 may be urged toward the cylinder rod 200b as the first and second layer end surfaces 213a', 213b' and the first and second bushing end surfaces 214a', 214b' clear the barrel end surface 201d, via the weight of the locking bracket 210, as illustrated. Alternatively, the locking bracket 210 may be urged toward the cylinder rod 200b via a tensile or compressive force from a spring, torque from a torsion spring, or some other conventional mechanism such as, for example, a shape of a structural member, or a weight of another part operably connected to the locking bracket 210.

Figure 19:
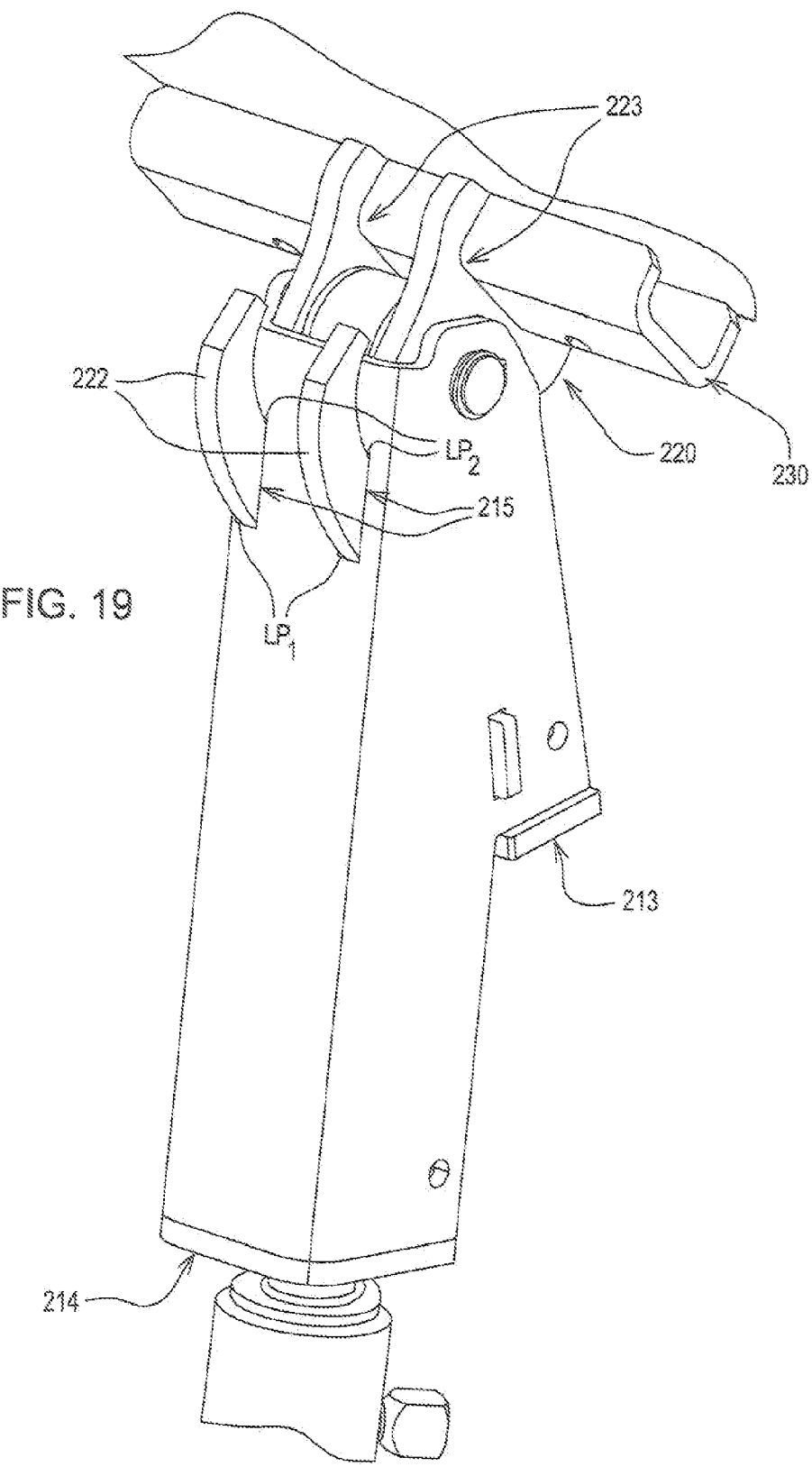
FIG. 19 is an oblique view of the locking portion with hooks engaging the slots of a locking bracket to stabilize the locking bracket.

As illustrated in FIGS. 17-19, the cab support hooks 222 may be designed such that they engage the locking bracket 210 once the locking bracket 210 starts moving toward the cylinder rod 200b. Once the cab support hooks 222 are engaged with the bracket slot 212, they substantially fill a space $D_s$ between an upper bracket slot edge 212a and a lower bracket slot edge 212b, thereby, restricting travel of the cylinder pin 211a along the cab plate slot 221 and, consequently, reducing play between the cab plate slots 221 and the cylinder pin 211a.

As illustrated, in FIG. 15, during vehicle operations the resting position of the cylinder rod pin 211a may be substantially at a midpoint along a length of the cab plate slots 221. This arrangement allows the cab 20 to move up and down with sufficient play to allow adequate cab movement for cab suspension. Naturally, the cab plate slots may be designed with a length sufficient to allow the full amount of anticipated cab movement via the suspension.

In operation the cab 20 may be returned to a suspended position from either locked position 1 or 2, by raising the cab enough for either the first and second end layer end surfaces 213a', 213b' or the first and second bushing surfaces 214a', 214b' to clear the end surface as the cylinder retracts, physically moving the locking bracket away from the cylinder rod 200b a distance sufficient for the bushings to clear the end surface and holding it there while fully retracting the locking cylinder. This may be accomplished manually or by some other conventional method or mechanism.

Naturally, all parts illustrated in connection with the makeup and operation of the locking cylinder 200 must be of suitable strength and may be metallic.

Having described the preferred embodiment, it will become apparent that various modifications can be made without departing from the scope of the invention as defined in the accompanying claims.

The invention claimed is:

1. A cab suspension system having an operating mode for vehicle operations and a service mode for servicing the vehicle, the cab suspension system comprising:
   a vehicle frame;
   a cab;
   a flexible suspension between the cab and the frame;
   a locking cylinder having a first end and a second end, the first end having a pivotal connection to the frame, the second end having an operable connection to the cab, the operable connection including a pivotal connection to the cab having an axis of rotation, the operable connection allowing relative movement between the pivotal connection to the cab and the locking cylinder when the cab suspension system is in the operating mode, the operable connection further allowing relative movement between the cab and the axis of rotation, the operable connection to the cab restricting relative movement between the pivotal connection to the cab and the locking cylinder when the suspension system is in the service mode.

2. The cab suspension system of claim 1, wherein the operable connection includes: a locking bracket; a cab plate having a hook and a slot; and a pin connecting the locking bracket and the cab plate to which the locking bracket is rotationally attached, the pin capable of moving along the slot, movement of the pin along the slot is restricted via an action between the hook, the bracket and the slot as the hydraulic cylinder extends under a load.

3. The cab suspension system of claim 2, wherein the pin provides the axis of rotation.

4. The cab suspension system of claim 2, wherein the hook includes walls thereof and the walls of the hook are distinct from any walls that define the slot.

5. The cab suspension system of claim 1, further comprising a cab support bracket for supporting a weight of the cab, the hook and the cab support bracket cooperating to support the weight in the service mode.

6. The cab suspension of claim 5, wherein the hook is operable to engage the support bracket.

7. A suspension system having an operating mode and a service mode, comprising;
   a vehicle frame;
   a weight;
   a flexible suspension between the weight and the frame;
   a locking cylinder including a barrel and a rod, the locking cylinder having a first end and a second end, the first end having an operable connection to one of the frame and the weight, the second end having a pivotal connection to the other of the frame and the weight, the operable connection including a pivotal connection to the one of the frame and the weight, the operable connection allowing relative translational movement between the pivotal connection to the one of the frame and the weight and cab when the cab suspension system is in the operating mode, the operable connection restricting relative movement between the pivotal connection to the one of the cab and the frame and the first end when the suspension system is in the service mode.

8. The cab suspension system of claim 7, wherein the operable connection includes: a locking bracket; a cab plate having a hook and a slot; and a pin connecting the locking bracket and the cab plate to which the locking bracket is rotationally attached, the pin capable of moving along the slot, movement of the pin along the slot is restricted via an action between the hook, the bracket and the slot as the hydraulic cylinder extends under a load.

9. The cab suspension system of claim 8, further comprising a cab bracket for supporting a weight of the cab, the hook and the cab bracket cooperating to support the weight in the service mode.

10. The cab suspension of claim 9, wherein the hook is operable to engage the support bracket.

11. The cab suspension system of claim 8, wherein the pin provides the axis of rotation.

12. The cab suspension system of claim 8, wherein the hook includes walls thereof and the walls of the hook are distinct from any walls that define the slot.

13. A locking cylinder comprising:
   a hydraulic cylinder having a rod with an outer rod diameter and a barrel, the barrel having an outer barrel diameter and a barrel end surface;
   a locking bracket having a first portion with a first end surface and a second portion with a second end surface, the first portion having an opening greater than an outer diameter of the rod and a smaller than the outer diameter of the barrel, the second portion having an opening greater than an outer diameter of the rod and a smaller than the outer diameter of the barrel, the first end surface and the second end surface operable to selectively engage the barrel end surface;
   a cab plate having a hook and a slot; and
   a pin connecting the locking bracket and the cab plate to which the locking bracket is rotationally attached, the pin capable of moving along the slot, movement of the pin along the slot is restricted via an action between the hook, the bracket and the slot as the hydraulic cylinder extends under a load.

14. The locking cylinder of claim 13, wherein the load comprises a weight of the cab.

15. The locking cylinder of claim 14, wherein the weight is structurally supported at a first extension of the cylinder via a first structural support and at a second extension of the cylinder via a second structural support.

16. The locking cylinder of claim 15, wherein the first structural support includes the first end surface and the second structural support includes the second end surface.

17. A locking cylinder comprising:
   a hydraulic cylinder having a rod with an outer rod diameter and a barrel, the barrel having an outer barrel diameter and a barrel end surface;
   a locking bracket having a first portion with a first end surface and a second portion with a second end surface, the first portion having an opening greater than an outer diameter of the rod and a smaller than the outer diameter of the barrel, the second portion having an opening greater than an outer diameter of the rod and a smaller than the outer diameter of the barrel;
   a cab plate having a hook and a slot; and
   a pin connecting the locking bracket and the cab plate to which the locking bracket is rotationally attached, the pin capable off moving along the slot, movement of the pin along the slot is restricted via an action between the hook, the bracket and the slot as the hydraulic cylinder extends under a load that comprises a weight of the cab, the weight being structurally supported at a first extension of the cylinder via a first structural support and at a second extension of the cylinder via a second structural support, the barrel end surface cooperating with at least one of the first end surface and the second end surface to form a portion of at least one of the first structural support and the second structural support.

* * * * *